US012769156B2

(12) United States Patent
Liang et al.

(10) Patent No.: US 12,769,156 B2
(45) Date of Patent: Oct. 20, 2026

(54) ELECTRO-OPTIC MODULATOR AND ELECTRO-OPTIC DEVICE

(71) Applicant: NANJING LYCORE TECHNOLOGIES CO., LTD., Nanjing (CN)

(72) Inventors: Hanxiao Liang, Nanjing (CN); Yipin Song, Nanjing (CN); Yingcong Zhou, Nanjing (CN); Haicang Wu, Nanjing (CN); Wenhao Mao, Nanjing (CN); Shiwei Song, Nanjing (CN); Weiqi Sun, Nanjing (CN); Qingyang Yu, Nanjing (CN)

(73) Assignee: NANJING LYCORE TECHNOLOGIES CO., LTD., Nanjing (CN)

( * ) Notice: Subject to any disclaimer, the term of this patent is extended or adjusted under 35 U.S.C. 154(b) by 289 days.

(21) Appl. No.: 18/688,108

(22) PCT Filed: Jul. 8, 2022

(86) PCT No.: PCT/CN2022/104535
§ 371 (c)(1),
(2) Date: Feb. 29, 2024

(87) PCT Pub. No.: WO2023/040434
PCT Pub. Date: Mar. 23, 2023

(65) Prior Publication Data

US 2024/0393626 A1 Nov. 28, 2024

(30) Foreign Application Priority Data

Sep. 15, 2021 (CN) ......................... 202111082353.7
Jan. 12, 2022 (CN) ......................... 202210031154.1

(51) Int. Cl.
*G02F 1/035* (2006.01)

(52) U.S. Cl.
CPC .................................. *G02F 1/035* (2013.01)

(58) Field of Classification Search
CPC ...................................................... G02F 1/035
See application file for complete search history.

(56) References Cited

U.S. PATENT DOCUMENTS

2004/0033001 A1 2/2004 Nagata et al.
2021/0157177 A1 5/2021 Kharel et al.
2022/0334419 A1* 10/2022 Liang ..................... G02F 1/365

FOREIGN PATENT DOCUMENTS

CN 111505845 8/2020
CN 111522153 8/2020
(Continued)

OTHER PUBLICATIONS

Office Action in Japanese Appln. No. 2024-516728, mailed on Jan. 24, 2025, 14 pages (with English translation).
(Continued)

*Primary Examiner* — Lisa M Caputo
(74) *Attorney, Agent, or Firm* — Fish & Richardson P.C.

(57) ABSTRACT

Provided are an electro-optic modulator and an electro-optic device. The electro-optic modulator includes: a substrate; an isolation layer located on the substrate; a thin film layer, used to form a first optical waveguide and a second optical waveguide, an arrangement of the first optical waveguide and the second optical waveguide causing the thin film layer to include a first edge region, a first optical waveguide, an intermediate region, a second optical waveguide, and a second edge region; and an electrode, including a first ground electrode, a signal electrode and a second ground electrode which are sequentially arranged at intervals. The first ground electrode at least includes a first main electrode,
(Continued)

the second ground electrode at least includes a second main electrode, and the signal electrode at least includes a third main electrode.

19 Claims, 13 Drawing Sheets

(56) References Cited

FOREIGN PATENT DOCUMENTS

| | | | |
|---|---|---|---|
| CN | 111522154 | | 8/2020 |
| CN | 113093411 | | 7/2021 |
| EP | 1321796 | | 6/2003 |
| JP | H08-166565 | A | 6/1996 |
| JP | 2000-122016 | A | 4/2000 |
| JP | 2002-90702 | A | 3/2002 |
| JP | 2008191614 | | 8/2008 |
| JP | 2009-86336 | A | 4/2009 |
| JP | 2020134875 | A | 8/2020 |

OTHER PUBLICATIONS

Extended European Search Report in European Appln. No. 22868811.5, mailed on Nov. 27, 2024, 10 pages.
Office Action in European Appln. No. 22868811.5-1207, mailed on Jun. 19, 2026, 9 pages.

* cited by examiner

ELECTRO-OPTIC MODULATOR AND ELECTRO-OPTIC DEVICE

CROSS-REFERENCE TO RELATED APPLICATION

The present application is a national stage filing under 35 U.S.C. § 371 of International Application No. PCT/CN2022/104535, filed on Jul. 8, 2022, which claims priority to Chinese Patent Application No. 202111082353.7, filed on Sep. 15, 2021 and Chinese Patent Application No. 202210031154.1, filed on Jan. 12, 2022. The contents of these applications are incorporated herein by reference in their entirety.

TECHNICAL FIELD

The present disclosure relates to electro-optic technologies, and in particular, to an electro-optic modulator and an electro-optic device.

BACKGROUND

Electro-optic modulators are modulators made by using the electro-optic effect of some electro-optic crystals, such as lithium niobate ($LiNbO_3$) crystals, gallium arsenide (GaAs) crystals, or lithium tantalate ($LiTaO_3$) crystals. When a voltage is applied to electro-optic crystals, a refractive index of the electro-optic crystals will change, thereby implementing modulation of the phase, amplitude, intensity, polarization state, and other characteristics of an optical signal. A common modulator among the electro-optic modulators is the Mach-Zehnder modulator. This interferometer-type modulator mainly uses a phase difference between two arms in the modulator to complete signal modulation of coherence enhancement and coherence cancellation.

Electro-optic modulation related technologies have been widely developed and applied in the fields of optical communications, microwave photonics, laser beam deflection, wavefront modulation, etc. Coplanar waveguide transmission lines are important components for implementing mutual matching and modulation of optical transmission and electrical transmission. In the design of the coplanar waveguide transmission lines, it is not only desired to minimize transmission loss, but also required to ensure that an optical transmission speed matches an electrical transmission speed.

SUMMARY

According to an aspect, embodiments of the present disclosure provide an electro-optic modulator, comprising: a substrate; an isolation layer located on the substrate; a thin film layer configured to form a first optical waveguide and a second optical waveguide, an arrangement of the first optical waveguide and the second optical waveguide causing the thin film layer to comprise a first edge region, the first optical waveguide, an intermediate region, the second optical waveguide and a second edge region; and an electrode, the electrode comprising a first ground electrode, a signal electrode and a second ground electrode that are sequentially arranged at intervals, the first ground electrode comprising at least a first main electrode, the second ground electrode comprising at least a second main electrode, the signal electrode comprising at least a third main electrode, the first optical waveguide being arranged in a first gap between the first main electrode and the third main electrode, the second optical waveguide being arranged in a second gap between the second main electrode and the third main electrode, the first main electrode and the second main electrode being arranged on a horizontal plane having a first height, the third main electrode being arranged on a horizontal plane having a second height, and the first height being different from the second height.

In another aspect, an embodiment of the present disclosure provides an electro-optic device, comprising the electro-optic modulator in any one of the embodiments described above.

It should be understood that the content described in this section is not intended to identify critical or important features of the embodiments of the present disclosure, and is not configured to limit the scope of the present disclosure. Other features of the present disclosure will be easily understood through the following description.

BRIEF DESCRIPTION OF THE DRAWINGS

More details, features, and advantages of the present disclosure are disclosed in the following description of example embodiments with reference to the accompany drawings, in which.

DETAILED DESCRIPTION

In the present disclosure, unless otherwise stated, the terms such as “first”, “second”, etc., used to describe various elements are not intended to limit the positional, temporal or importance relationship of these elements, but rather only to distinguish one element from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

In order to match an optical transmission speed with an electrical transmission speed, the transmission loss of a coplanar waveguide transmission line in a conventional electro-optic modulator is especially large. Therefore, a coplanar waveguide transmission line with an electrode extension portion is further provided in order to solve the problem of large transmission loss. However, with the increasingly urgent demand for high-speed, large-capacity and integrated communication technologies in applications, it is desired to ensure that the optical transmission speed matches with the electrical transmission speed while the transmission loss is minimized.

In the related art, the coplanar waveguide transmission line with an electrode extension portion may be used to solve the problem of large transmission loss. However, the optical and electrical transmission speeds typically depend on the characteristics of electro-optic materials. Especially, in the coplanar waveguide transmission line using the electrode extension portion, the electrode extension portion is configured to make an electrode structure more complex, causing it more difficult to match the optical and electrical transmission speeds.

Embodiments of the present disclosure provide an improved electro-optic modulator that is capable of alleviating, reducing, or even overcoming the above drawbacks.

Figure 1:
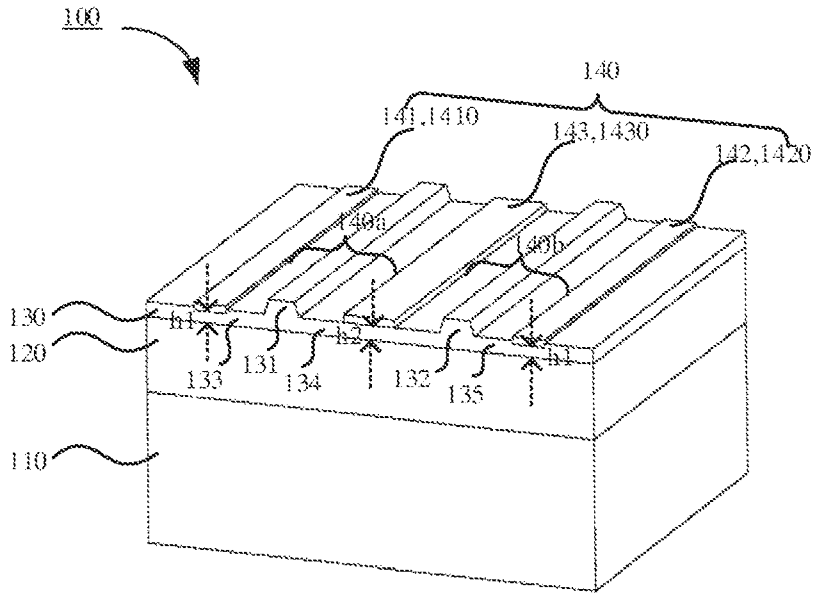
FIG. 1 is a schematic perspective view of an electro-optic modulator according to an example embodiment.

FIG. 1 is a schematic perspective view of an electro-optic modulator 100 according to an example embodiment. Referring to FIG. 1, the electro-optic modulator 100 may comprise a substrate 110, an isolation layer 120 located on the substrate 110, a thin film layer 130 and an electrode 140. The thin film layer 130 is configured to form a first optical waveguide 131 and a second optical waveguide 132. An arrangement of the first optical waveguide 131 and the second optical waveguide 132 causes the thin film layer 130 to comprise a first edge region 133, the first optical waveguide 131, an intermediate region 134, the second optical waveguide 132 and a second edge region 135. The electrode 140 may comprise a first ground electrode 141, a signal electrode 143 and a second ground electrode 142 that are sequentially arranged at intervals. The first ground electrode 141 comprises at least a first main electrode 1410, the second ground electrode 142 comprises at least a second main electrode 1420, and the signal electrode 143 comprises at least a third main electrode 1430; the first optical waveguide 131 is arranged in a first gap 140*a* between the first main electrode 1410 and the third main electrode 1430, and the second optical waveguide 132 is arranged in a second gap 140*b* between the second main electrode 1420 and the third main electrode 1430; and the first main electrode 1410 and the second main electrode 1420 are arranged on a horizontal plane having a first height h1, the third main electrode 1430 is arranged on a horizontal plane having a second height h2, and the first height h1 is different from the second height h2.

With the above arrangement, the first optical waveguide 131 and the second optical waveguide 132 may provide optical transmission paths for optical signals. The electrode 140 may provide an electrical transmission path for electrical signals. Therefore, an overall extension direction of the electrode 140 is the same as an extension direction of the optical transmission path. There is the first gap 140*a* between the first main electrode 1410 and the third main electrode 1430, and the first optical waveguide 131 is arranged in the first gap 140*a*; and there is the second gap 140*b* between the second main electrode 1420 and the third main electrode 1430, and the second optical waveguide 132 is arranged in the second gap 140*b*. Such a structure allows the first main electrode 1410 and the third main electrode 1430 and the second main electrode 1420 and the third main electrode 1430 to be respectively arranged on two sides of the corresponding optical waveguides, respectively forming electric fields acting on the corresponding optical waveguides, thereby implementing the regulation and control of the electrical signals on the optical signals.

A transmission speed of the electrical signal is mainly affected by a dielectric constant and a structure of a material; and a transmission speed of the optical signal is mainly affected by a refractive index and a structure of a material. In a conventional electro-optic modulator, an electro-optic material used for the thin film layer usually has a smaller refractive index and a larger dielectric constant, resulting in a higher transmission speed of the optical signal and a lower transmission speed of the electrical signal, thus making it difficult to match the two transmission speeds.

According to an embodiment of the present disclosure, by appropriately changing a structural relationship between the electrode and the thin film layer, the limitation of the electro-optic material on the transmission speed of the electrical signals can be regulated and controlled, that is, the transmission speed of the electrical signals can be regulated and controlled, and thus it is easier to implement good matching between the optical signals and the electrical signals. In an embodiment of the present disclosure, by arranging the first main electrode 1410 and the second main electrode 1420 on the horizontal plane having the same height, and arranging the third main electrode 1430 on the horizontal plane having a different height, separate regulation and control on the signal electrode and the ground electrode can be implemented, and it is more flexible and accurate to regulate and control the transmission speed of the electrical signals.

In an embodiment of the present disclosure, a described A structure is located on a B structure. It can be understood that the A structure is formed on a side of the B structure away from the substrate 110. Since the B structure has a certain thickness and a certain pattern or shape, after the A structure is formed, part of the A structure may be farther away from, closer to, or have the same distance from the substrate compared with part of the B structure.

In some embodiments, the thin film layer 130 may be located on the isolation layer 120, that is, the thin film layer 130 is formed on a side of the isolation layer 120 away from the substrate 110. In some embodiments, the electrode 140 is formed on a side of the thin film layer 130 away from the substrate 110.

Continuing to refer to FIG. 1, when the electrode 140 is located on the thin film layer 130, it is possible to implement an effect of adjusting a height of the electrode 140 by means of etching, for example, photoetching, a thin film material layer in the manufacturing process of the thin film layer 130, or by means of etching, for example, photoetching, an isolation material layer in the manufacturing process of the isolation layer 120. In addition, although lower surfaces of the first main electrode 1410, the second main electrode 1420 and the third main electrode 1430 in the above embodiment are located on the thin film layer 130, in some other embodiments, some of the first main electrode 1410, the second main electrode 1420 and the third main electrode 1430 can also penetrate through the thin film layer 130 to be in direct contact with a surface of the isolation layer 120 on the premise of meeting the requirement for height difference.

For example, the first main electrode and the second main electrode are embedded into the thin film layer, and penetrate through the thin film layer to be in direct contact with the isolation layer; alternatively, the first main electrode and the second main electrode are embedded into the thin film layer, and do not penetrate through the thin film layer. In this embodiment, on the premise of meeting the requirement for height difference, the third main electrode may or may not be embedded into the thin film layer.

For example, the third main electrode is embedded into the thin film layer, and penetrates through the thin film layer to be in direct contact with the isolation layer; alternatively, the third main electrode is embedded into the thin film layer, and does not penetrate through the thin film layer. On the premise of meeting the requirement for height difference, the first main electrode and the second main electrode may or may not be embedded into the thin film layer.

In some embodiments, each of the first ground electrode 141, the second ground electrode 142 and the signal electrode 143 may comprise an electrode extension portion (not shown in FIG. 1). A structure and a shape of the electrode extension portion are not limited to the methods illustrated in the present disclosure, and other methods may also be used. For example, the electrode extension portion may be a T-shaped or L-shaped sub-electrode, and the electrode extension portion may also be of a planar extending structure.

In some embodiments, the ground electrode may comprise an electrode extension portion (not shown in FIG. 1). The first ground electrode 141 and the second ground electrode 142 each comprise at least one electrode extension portion. The at least one electrode extension portion of the first ground electrode 141 extends into the first gap 140*a* from a side of the first main electrode 1410 facing the third main electrode 1430, and the at least one electrode extension portion of the second ground electrode 142 extends into the second gap 140*b* from a side of the second main electrode 1420 facing the third main electrode 1430.

In some embodiments, the signal electrode may comprise an electrode extension portion (not shown in FIG. 1). The signal electrode 143 comprises at least one electrode extension portion that extends into the first gap 140*a* and the second gap 140*b* respectively from a side of the third main electrode 1430 facing the first main electrode 1410 and a side of the third main electrode 1430 facing the second main electrode 1420.

By providing the electrode extension portion on at least one structure of the first ground electrode 141, the second ground electrode 142 and the signal electrode 143, an interval between the signal electrode 143 and the ground electrode is reduced, which is beneficial to reducing the transmission loss of an electrical signal of a modulation voltage. In addition, some inherent characteristics of the electrode structure, such as impedance and a propagation speed of electrical signals, are closely related to some properties (such as the length of the electrode extension portions and the length of the electrode) of these electrode extension portions. Therefore, during actual manufacturing of the electrode structure, values of these properties can be flexibly set, such that the impedance of the electro-optic modulator made of the electrode structure is the same as or similar to the impedance (generally 50Ω) of an input end, and the propagation speed of the electrical signals in a modulation circuit is the same as or similar to the speed of light in the optical waveguide, thereby improving an optical modulation effect.

In some embodiments, the electro-optic modulator 100 further comprises a covering layer that at least partially covers an upper surface of the thin film layer. For example, the covering layer covers at least the first optical waveguide 131 and the second optical waveguide 132, and the refractive index of the covering layer is lower than that of the thin film layer 130.

The electrode extension portion may extend onto the covering layer on the optical waveguides. For example, in some embodiments, the at least one electrode extension portion of the first ground electrode 141 extends from a side of the first main electrode 1410 facing the third main electrode 1430 onto the covering layer on the first optical waveguide 131, and the at least one electrode extension portion of the second ground electrode 142 extends from a side of the second main electrode 1420 facing the third main electrode 1430 onto the covering layer on the second optical waveguide 132. For another example, in some embodiments, the at least one electrode extension portion of the signal electrode 143 extends respectively from a first side of the third main electrode 1430 facing the first main electrode 1410 and a second side of the third main electrode 1430 facing the second main electrode 1420 onto the covering layer on the first optical waveguide 131 and the covering layer on the second optical waveguide 132.

Generally speaking, a modulation signal voltage (i.e. a voltage applied between the signal electrode 143 and the ground electrode) is related to the size of the first gap 140*a* and the size of the second gap 140*b*. With the above arrangement, the first gap 140*a* and the second gap 140*b* can be reduced (that is, the signal electrode 143 and the ground electrode are allowed to be close to each other), thereby improving the electro-optic modulation efficiency. However, if the signal electrode 143 or the ground electrode is provided too close to the optical waveguides, the electrode may affect the normal transmission of light in the first optical waveguide 131 or the second optical waveguide 132. According to the electrode structure in this embodiment, the covering layer 150 located on the optical waveguides is additionally provided, and the electrode extension portion of the signal electrode 143 or the ground electrode extends to an upper surface of the covering layer 150. With such an arrangement, it is ensured that a distance between the electrode extension portion of the signal electrode 143 and the electrode extension portion of the ground electrode is close enough, and it is also ensured that there is a certain distance between the electrode extension portion and the corresponding optical waveguide (i.e. the first optical waveguide 131 or the second optical waveguide 132). Therefore, by means of the electrode structure in this embodiment, the electro-optic conversion efficiency is increased, and the normal transmission of light in the first optical waveguide 131 or the second optical waveguide 132 is prevented from being affected, so that the modulation effect of a waveguide line electrode structure is significantly improved.

In some embodiments, the thin film layer 130 is an etched X-cut, Y-cut, or Z-cut thin film of lithium niobate. Accordingly, the first optical waveguide 131 and the second optical waveguide 132 are lithium niobate optical waveguides. Lithium niobate crystals have a smooth surface and are an optical material with excellent electro-optic and acousto-optic effects. High-quality optical waveguides prepared using lithium niobate crystals can support an ultra-low transmission loss, and have many excellent characteristics such as mature technology, low cost, and mass production.

In some embodiments, the electro-optic modulator 100 further comprises a protective layer configured to cover the electrode and the thin film layer, thereby covering at least one functional component of the electro-optic modulator 100, such as an optical waveguide, a ground electrode, a signal electrode, etc. The electrode 140 is covered with the protective layer, so that natural oxidation or accidental surface damage of the electrode can be slowed down, and the service life of elements can be prolonged.

In the embodiments of the present disclosure, the height of the electrode may also be adjusted according to a design of the covering layer.

Figure 2:
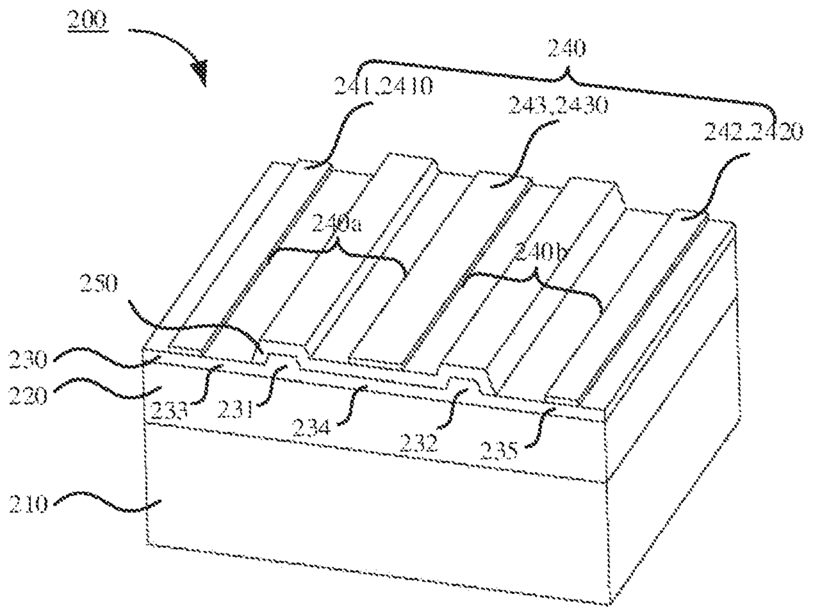
FIG. 2 is a schematic perspective view of an electro-optic modulator according to an example embodiment.

FIG. 2 is a schematic perspective view of an electro-optic modulator 200 according to an example embodiment. The electro-optic modulator 200 may comprise a substrate 210, an isolation layer 220 located on the substrate 210, a thin film layer 230, and an electrode 240. The thin film layer 230 is configured to form a first optical waveguide 231 and a second optical waveguide 232. An arrangement of the first optical waveguide 231 and the second optical waveguide 232 causes the thin film layer 230 to comprise a first edge region 233, the first optical waveguide 231, an intermediate region 234, the second optical waveguide 232 and a second edge region 235. The electrode 240 may comprise a first ground electrode 241, a signal electrode 243 and a second ground electrode 242 that are sequentially arranged at intervals. There is a first gap 240*a* between a first main electrode 2410 of the first ground electrode 241 and a third main electrode 2430 of the signal electrode 243; and there is a second gap 240*b* between a second main electrode 2420 of the second ground electrode 242 and the third main electrode 2430 of the signal electrode 243. Reference numerals similar to those in FIG. 1 indicate similar elements, and therefore detailed description thereof is omitted for the sake of brevity.

The difference between the electro-optic modulator 200 shown in FIG. 2 and the electro-optic modulator 100 shown in FIG. 1 lies in that the electro-optic modulator 200 further comprises a covering layer 250. The covering layer 250 at least partially covers an upper surface of the thin film layer 230. The refractive index of the covering layer 250 is lower than that of the thin film layer 230.

By adding the covering layer 250 on the upper surface of the thin film layer 230, it is possible to be appropriately away from an electro-optic material in the thin film layer 230, thereby reducing the limitation of the electro-optic material on the transmission speed of electrical signals. Also, the refractive index of the covering layer 250 is less than that of the thin film layer 230 so as to prevent the light transmitted in the optical waveguides from being emitted.

In some embodiments, as shown in FIG. 2, the covering layer 250 may cover upper surfaces of the first optical waveguide 231, the intermediate region 234 and the second optical waveguide 232, where the first main electrode 2410 and the second main electrode 2420 are located on the thin film layer 230, and the third main electrode 2430 is located on the covering layer 250. In some other embodiments, the covering layer 250 may not cover the upper surfaces of the first optical waveguide 231 and the second optical waveguide 232, but may be provided only in the intermediate region 234.

By adding the covering layer 250 on the upper surface of the thin film layer 230, the transmission speed of the electrical signals can be increased, and the limitation of the electro-optic material on the transmission speed of the electrical signals can be reduced. However, if the upper surface of the thin film layer 230 is indiscriminately covered with a covering layer having the same thickness, the third main electrode will be at the same height as the first main electrode and the second main electrode. In this way, the regulation and control caused by the covering layer have almost the same impact on the third main electrode as the first main electrode and the second main electrode, which is not conducive to the regulation and control on the transmission speed of the electrical signals.

In the embodiments of the present disclosure, by selectively providing the covering layers 250 having different thicknesses in different regions, separate regulation and control on the signal electrode 243 and the ground electrode can be implemented, and it is more flexible and accurate to regulate and control the transmission speed of the electrical signals. As described in the embodiment shown in FIG. 2, the covering layer 250 may cover only the upper surfaces of the first optical waveguide 231, the intermediate region 234 and the second optical waveguide 232, such that a material in contact with the third main electrode 2430 is different from those in contact with the first main electrode 2410 and the second main electrode 2420. In this embodiment, since the ground electrode and the signal electrode each do not comprise an electrode extension portion, even though the ground electrode and the signal electrode 243 are in contact with different materials, regulation and control parameters of the transmission speed of the electrical signals are increased, such that it is more flexible and accurate to regulate and control the transmission speed of the electrical signals, and thus it is easier to match the transmission speed of the optical signals and the electrical signals.

In some embodiments, the electrode 230 may comprise an electrode extension portion. A method in which the electrode 230 extends is not limited to the methods illustrated in the present disclosure, and other methods may also be used.

Figure 3:
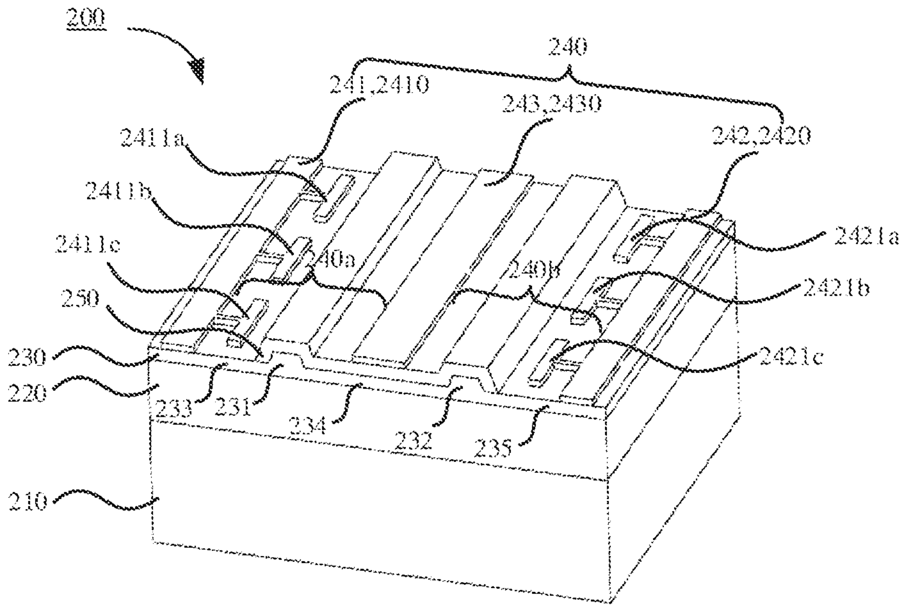
FIG. 3 is a schematic perspective view of an electro-optic modulator according to an example embodiment.

In some embodiments, the ground electrode may comprise an electrode extension portion. As shown in FIG. 3, the first ground electrode 241 and the second ground electrode 242 each comprise at least one electrode extension portion. The at least one electrode extension portion of the first ground electrode 241 (a plurality of electrode extension portions 2411*a*, 2411*b*, 2411*c* are illustrated in the embodiment shown in FIG. 3) extends into the first gap 240*a* from a side of the first main electrode 2410 facing the third main electrode 2430, and the at least one electrode extension portion of the second ground electrode 242 (a plurality of electrode extension portions 2421*a*, 2421*b*, 2421*c* are illustrated in the embodiment shown in FIG. 3) extends into the second gap 240*b* from a side of the second main electrode 2420 facing the third main electrode 2430.

Figure 4:
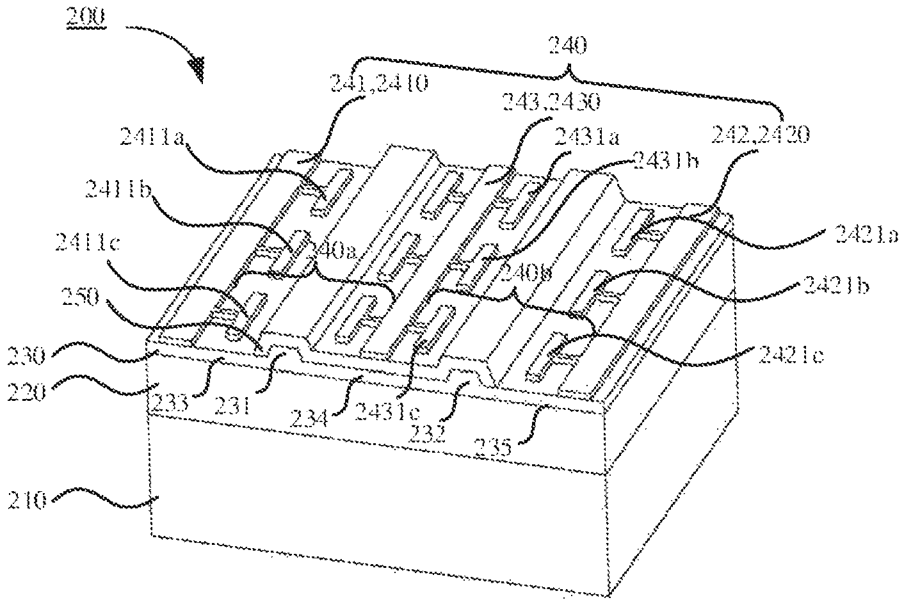
FIG. 4 is a schematic perspective view of an electro-optic modulator according to an example embodiment.

In some embodiments, the signal electrode may comprise an electrode extension portion. As shown in FIG. 4, the signal electrode 243 comprises at least one electrode extension portion (a plurality of electrode extension portions 2431*a*, 2431*b*, 2431*c* on one side of the signal electrode 243 are illustrated in the embodiment shown in FIG. 4), which extends into the first gap 240*a* and the second gap 240*b* respectively from a side of the third main electrode 2430 facing the first main electrode 2410 and a side of the third main electrode 2430 facing the second main electrode 2420.

In addition, although lower surfaces of the first main electrode 2410 and the second main electrode 2420 are located on the thin film layer 230 in the above embodiment, in some other embodiments, these two main electrodes may also penetrate through the thin film layer to be in direct contact with a surface of the isolation layer. Alternatively, the first main electrode and the second main electrode are embedded into the thin film layer, and do not penetrate through the thin film layer.

Similarly, although the lower surface of the third main electrode 2430 is located on the covering layer 250 in the above embodiment, in some other embodiments, the third main electrode may also penetrate through the covering layer to be in direct contact with the surface of the thin film layer. Alternatively, the third main electrode is embedded into the covering layer, and does not penetrate through the covering layer.

In some embodiments, when the covering layer 250 is made of a material with a low dielectric constant, since the electrode 240 is in contact with the covering layer 250 with a low dielectric constant in this case, the transmission speed of the electrical signals can be significantly increased, and thus it is easier to implement good matching between the optical signals and the electrical signals.

In some embodiments, the covering layer 250 is an insulation layer.

Some other modified embodiments of the present disclosure will be further described below with reference to FIGS. 5 to 8.

Figure 5:
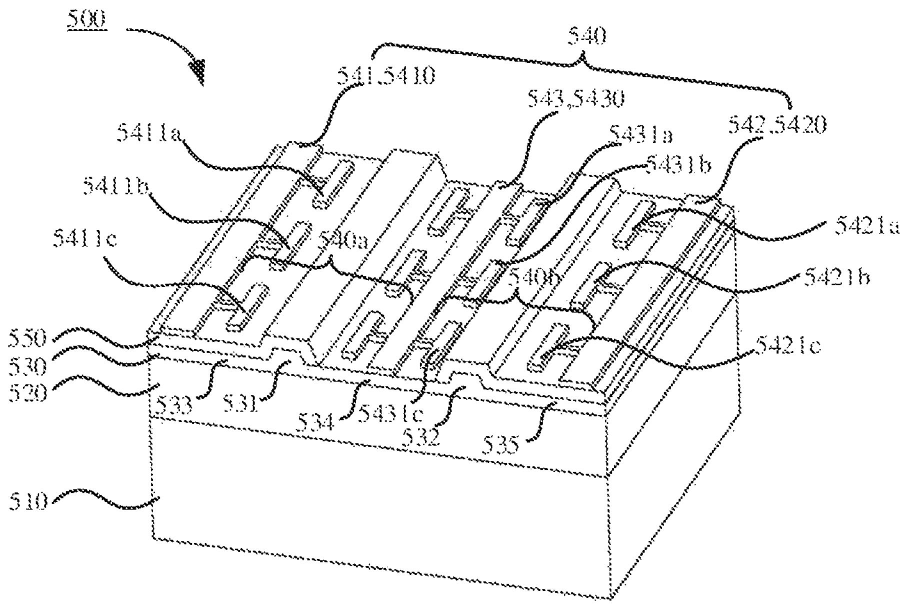
FIG. 5 is a schematic perspective view of an electro-optic modulator according to an example embodiment.

FIG. 5 is a schematic perspective view of an electro-optic modulator 500 according to an example embodiment. The electro-optic modulator 500 may comprise a substrate 510, an isolation layer 520 located on the substrate 510, a thin film layer 530, an electrode 540, and a covering layer 550. The thin film layer 530 is configured to form a first optical waveguide 531 and a second optical waveguide 532. An arrangement of the first optical waveguide 531 and the second optical waveguide 532 causes the thin film layer 530 to comprise a first edge region 533, the first optical waveguide 531, an intermediate region 534, the second optical waveguide 532 and a second edge region 535. The electrode 540 may comprise a first ground electrode 541, a signal electrode 543 and a second ground electrode 542 that are sequentially arranged at intervals. There is a first gap 540*a* between a first main electrode 5410 of the first ground electrode 541 and a third main electrode 5430 of the signal electrode 543; and there is a second gap 540*b* between a second main electrode 5420 of the second ground electrode 542 and the third main electrode 5430 of the signal electrode 543. Reference numerals similar to those in FIG. 4 indicate similar elements, and therefore detailed description thereof is omitted for the sake of brevity.

The electro-optic modulator 500 shown in FIG. 5 is different from the electro-optic modulator 200 shown in FIG. 4 in that the covering layer 550 in FIG. 5 covers upper surfaces of the first edge region 533, the first optical waveguide 531, the second optical waveguide 532 and the second edge region 535, where the first main electrode 5410 and the second main electrode 5420 are located on the covering layer 550, and the third main electrode 5430 is located on the thin film layer 530. In some other embodiments, the covering layer 550 may not cover the upper surfaces of the first optical waveguide 531 and the second optical waveguide 532, but may be provided only in the first edge region 533 and the second edge region 535.

By adding the covering layer 550 on the upper surface of the thin film layer 530, the transmission speed of the electrical signals can be increased, and the limitation of the electro-optic material on the transmission speed of the electrical signals can be reduced. However, if the upper surface of the thin film layer 530 is indiscriminately covered with a covering layer having the same thickness, the third main electrode will be at the same height as the first main electrode and the second main electrode. In this way, the regulation and control caused by the covering layer have almost the same impact on the third main electrode as the first main electrode and the second main electrode, which is not conducive to the regulation and control on the transmission speed of the electrical signals.

In the embodiments of the present disclosure, by selectively providing the covering layers 550 having different thicknesses in different regions, separate regulation and control on the signal electrode 543 and the ground electrode can be implemented, and it is more flexible and accurate to regulate and control the transmission speed of the electrical signals. As described in the embodiment shown in FIG. 5, the covering layer 550 may cover only the upper surfaces of the first edge region 533, the first optical waveguide 531, the second optical waveguide 532 and the second edge region 535, allowing a material in contact with the third main electrode 5430 to be different from those in contact with the first main electrode 5410 and the second main electrode 5420, such that regulation and control parameters of the transmission speed of the electrical signals are increased, it is more flexible and accurate to regulate and control the transmission speed of the electrical signals, and thus it is easier to match the transmission speed of the optical signals and the electrical signals.

In some embodiments, the electrode 530 may comprise an electrode extension portion. A method in which the electrode 530 extends is not limited to the methods illustrated in the present disclosure, and other methods may also be used.

In some embodiments, the ground electrode may comprise an electrode extension portion. Continuing to refer to FIG. 5, the first ground electrode 541 and the second ground electrode 542 each comprise at least one electrode extension portion. The at least one electrode extension portion of the first ground electrode 541 (a plurality of electrode extension portions 5411*a*, 5411*b*, 5411*c* are illustrated in the embodiment shown in FIG. 5) extends into the first gap 540*a* from a side of the first main electrode 5410 facing the third main electrode 5430, and the at least one electrode extension portion of the second ground electrode 542 (a plurality of electrode extension portions 5421*a*, 5421*b*, 5421*c* are illustrated in the embodiment shown in FIG. 5) extends into the second gap 540*b* from a side of the second main electrode 5420 facing the third main electrode 5430.

In some embodiments, the signal electrode may comprise an electrode extension portion. Continuing to refer to FIG. 5, the signal electrode 543 comprises at least one electrode extension portion (a plurality of electrode extension portions 5431*a*, 5431*b*, 5431*c* are illustrated in the embodiment shown in FIG. 5), which extends into the first gap 540*a* and the second gap 540*b* respectively from a side of the third main electrode 5430 facing the first main electrode 5410 and a side of the third main electrode 5430 facing the second main electrode 5420.

It should be additionally explained that although the first ground electrode 541, the signal electrode 543 and the second ground electrode 542 each have the electrode extension portions in the embodiment shown in FIG. 5, in some other embodiments, similar to the arrangement of the embodiment in FIG. 1 or FIG. 2, the first ground electrode, the signal electrode and the second ground electrode may each be provided with no electrode extension portions, or similar to the arrangement of the embodiment in FIG. 3, some of the first ground electrode, the signal electrode and the second ground electrode are provided with the electrode extension portions.

Figure 6:
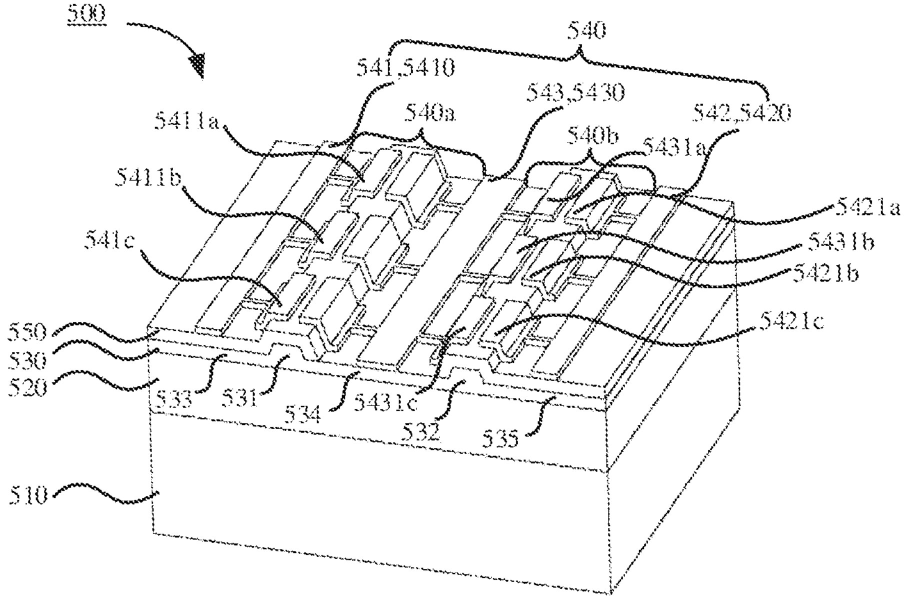
FIG. 6 is a schematic perspective view of an electro-optic modulator according to an example embodiment.
Figure 7:
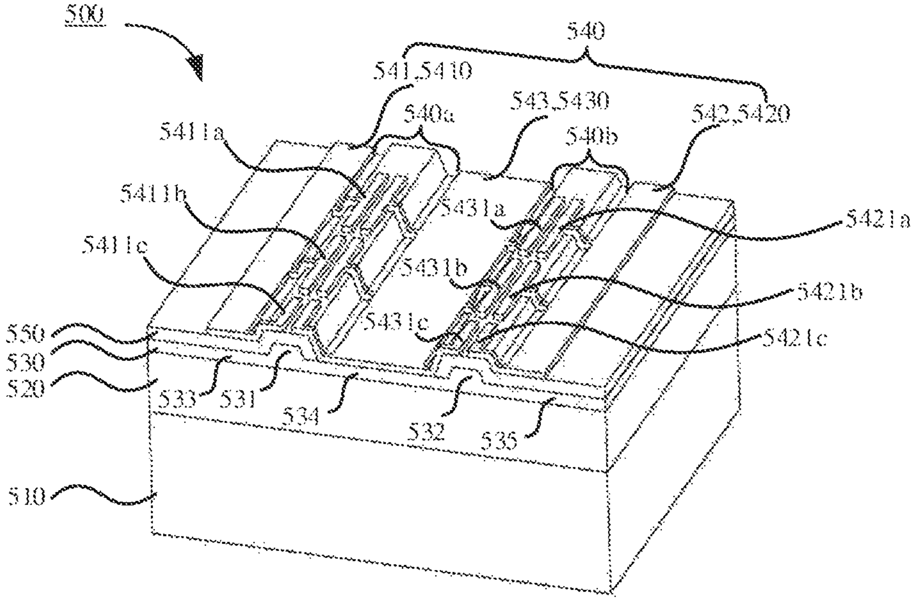
FIG. 7 is a schematic perspective view of an electro-optic modulator according to an example embodiment.

In some embodiments, the electrode extension portion may extend onto the upper surface of the covering layer on the optical waveguides. Referring to FIGS. 6 and 7, in some embodiments, at least one electrode extension portion (see the electrode extension portions 5411*a*, 5411*b*, 5411*c*) of the first ground electrode 541 extends from a side of the first main electrode 5410 facing the third main electrode 5430 onto the covering layer 550 on the first optical waveguide 531, and at least one electrode extension portion (see the electrode extension portions 5421*a*, 5421*b*, 5421*c*) of the second ground electrode 542 extends from a side of the second main electrode 5420 facing the third main electrode 5430 onto the covering layer 550 on the second optical waveguide 532. For another example, in some embodiments, at least one electrode extension portion (see the electrode extension portions 5431*a*, 5431*b*, 5431*c*) of the signal electrode 543 extends respectively from a first side of the third main electrode 5430 facing the first main electrode 5410 and a second side of the third main electrode 5430 facing the second main electrode 5420 onto the covering layer 550 on the first optical waveguide 531 and the covering layer 550 on the second optical waveguide 532.

In some embodiments, such as the embodiment shown in FIG. 6, one part of the electrode extension portion extends in a plane where the main electrode connected thereto is located, and the other part thereof extends onto the covering layer on the corresponding optical waveguide. For example, at least one of the electrode extension portions 5411*a*, 5411*b*, 5411*c* of the first ground electrode 541 partially extends in a plane where the first main electrode 5410 is located, and partially extends onto the covering layer 550 on the first optical waveguide 531, and at least one of the electrode extension portions 5421*a*, 5421*b*, 5421*c* of the second ground electrode 542 or at least one of the electrode extension portions 5431*a*, 5431*b*, 5431*c* of the signal electrode 543 may also be similarly provided correspondingly.

In some other embodiments, such as the embodiment shown in FIG. 7, the electrode extension portion directly extends onto the upper surface of the covering layer on the corresponding optical waveguide. For example, at least one of the electrode extension portions 5411*a*, 5411*b*, 5411*c* of the first ground electrode 541 directly extends onto the covering layer 550 on the first optical waveguide 531, and at least one of the electrode extension portions 5421*a*, 5421*b*, 5421*c* of the second ground electrode 542 or at least one of the electrode extension portions 5431*a*, 5431*b*, 5431*c* of the signal electrode 543 may also be similarly provided correspondingly.

In addition, although the lower surfaces of the first main electrode 5410 and the second main electrode 5420 are located on the covering layer 550 in the above embodiment, in some other embodiments, these two main electrodes may also penetrate through the covering layer to be in direct contact with a surface of the thin film layer. Alternatively, the first main electrode and the second main electrode are embedded into the covering layer, and do not penetrate through the covering layer.

Similarly, although the lower surface of the third main electrode 5430 is located on the thin film layer 530 in the above embodiment, in some other embodiments, the third main electrode may also penetrate through the thin film layer to be in direct contact with the surface of the isolation layer. Alternatively, the third main electrode is embedded into the thin film layer, and does not penetrate through the thin film layer.

Figure 8:
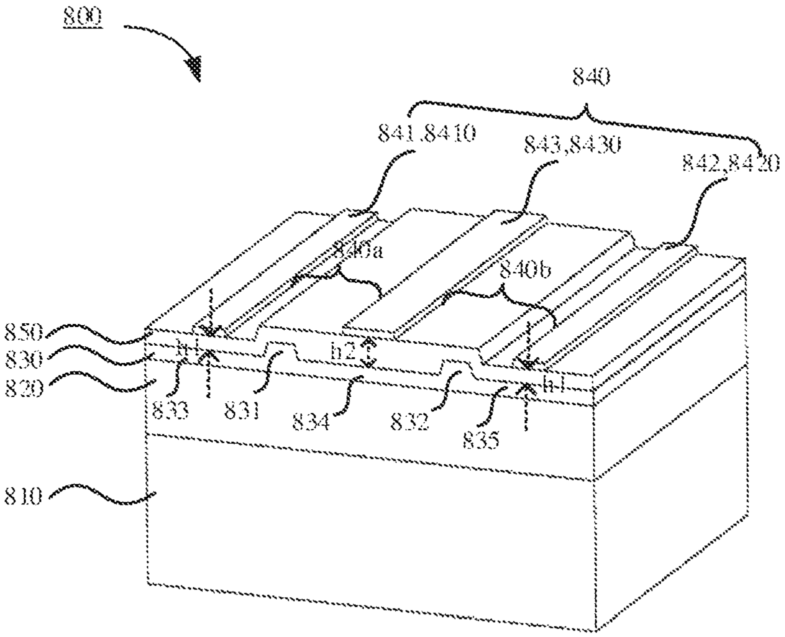
FIG. 8 is a schematic perspective view of an electro-optic modulator according to an example embodiment.

FIG. 8 is a schematic perspective view of an electro-optic modulator 800 according to an example embodiment. The electro-optic modulator 800 may comprise a substrate 810, an isolation layer 820 located on the substrate 810, a thin film layer 830, an electrode 840, and a covering layer 850. The thin film layer 830 is configured to form a first optical waveguide 831 and a second optical waveguide 832. An arrangement of the first optical waveguide 831 and the second optical waveguide 832 causes the thin film layer 830 to comprise a first edge region 833, the first optical waveguide 831, an intermediate region 834, the second optical waveguide 832 and a second edge region 835. The electrode 840 may comprise a first ground electrode 841, a signal electrode 843 and a second ground electrode 842 that are sequentially arranged at intervals. There is a first gap 840*a* between a first main electrode 8410 of the first ground electrode 841 and a third main electrode 8430 of the signal electrode 843; and there is a second gap 840*b* between a second main electrode 8420 of the second ground electrode 842 and the third main electrode 8430 of the signal electrode 843. Reference numerals similar to those in FIG. 2 indicate similar elements, and therefore detailed description thereof is omitted for the sake of brevity.

The electro-optic modulator 800 shown in FIG. 8 is different from the electro-optic modulator 200 shown in FIG. 2 in that the covering layer 850 in FIG. 8 covers an upper surface of the thin film layer 830, where the electrode 840 is wholly located on the covering layer 850, and a portion of the covering layer 850 provided with the first main electrode 8410 and the second main electrode 8420 has a different thickness from that of a portion of the covering layer 850 provided with the third main electrode 8430, that is, h1 and h2 are different.

As mentioned above, in the embodiments of the present disclosure, by selectively providing the covering layers 850 having different thicknesses in different regions, separate regulation and control on the signal electrode 843 and the ground electrode can be implemented, and it is more flexible and accurate to regulate and control the transmission speed of the electrical signals. As described in the embodiment shown in FIG. 8, the thickness of the portion of the covering layer 850 provided with the first main electrode 8410 and the second main electrode 8420 is represented by h1, and the thickness of the portion of the covering layer provided with the third main electrode 8430 is represented by h2. The two different thicknesses allow a distance between the main electrodes of the two ground electrodes and the thin film layer 830 and a distance between the main electrode of the signal electrode and the thin film layer 830 to be different, such that the regulation and control parameters of the transmission speed of the electrical signals are increased, it is more flexible and accurate to regulate and control the transmission speed of the electrical signals, and thus it is easier to match the transmission speed of the optical signals and the electrical signals.

Similar to the above-described embodiments, the electrode 830 may further comprise an electrode extension portion. For the sake of brevity, detailed description is omitted herein.

In addition, although the lower surfaces of the first main electrode 8410, the second main electrode 8420 and the third main electrode 8430 are located on the covering layer 850 in the above embodiment, in some other embodiments, the main electrodes of the two ground electrodes or the main electrode of the signal electrode may also penetrate through the covering layer to be in direct contact with the surface of the thin film layer. Alternatively, the main electrodes of the two ground electrodes or the main electrode of the signal electrode are embedded into the covering layer, and do not penetrate through the covering layer.

Figure 9A:
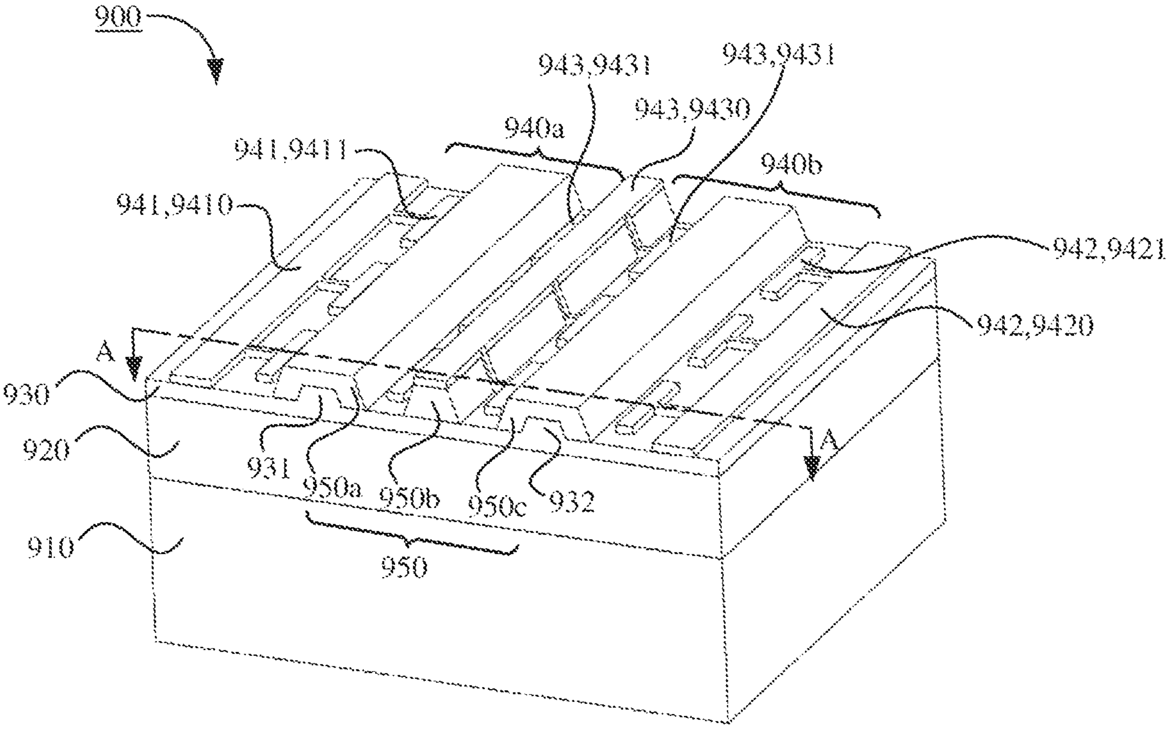
FIG. 9A is a schematic perspective view of an electro-optic modulator according to an example embodiment.
Figure 9B:
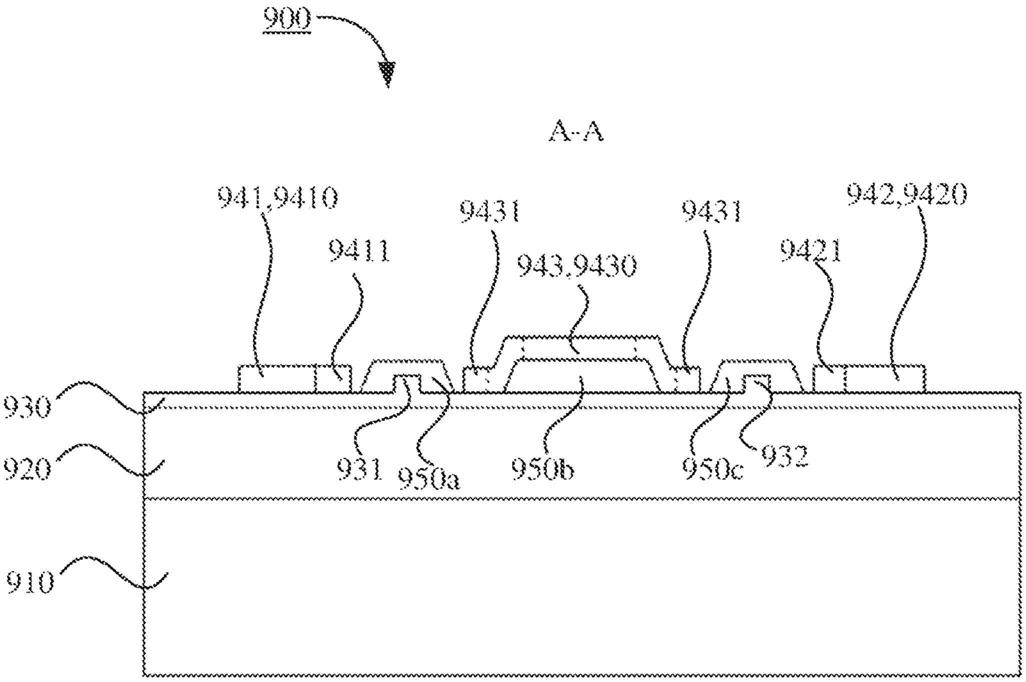
FIG. 9B is a schematic cross-sectional view along line A-A in FIG. 9A.

As shown in FIGS. 9A and 9B, in the electro-optic modulator 900 of some embodiments of the present disclosure, a first ground electrode 941 and a second ground electrode 942 each further comprise at least one electrode extension portion (respectively such as electrode extension portions 9411, 9421 shown in the figures), at least one electrode extension portion 9411 of the first ground electrode 941 extends into a first gap 940*a* from a side of a first main electrode 9410 facing a third main electrode 9430, and at least one electrode extension portion 9421 of the second ground electrode 942 extends into a second gap 940*b* from a side of a second main electrode 9420 facing the third main electrode 9430; a signal electrode 943 further comprises at least one electrode extension portion 9431 that extends into the first gap 940*a* and the second gap 940*b* respectively from a side of the third main electrode 9430 facing the first main electrode 9410 and a side of the third main electrode 9430 facing the second main electrode 9420; where a terminal of the at least one electrode extension portion 9411 of the first ground electrode 941 close to the third main electrode 9430, a terminal of the at least one electrode extension portion 9421 of the second ground electrode 942 close to the third main electrode 9430, and a terminal of the at least one electrode extension portion 9431 of the signal electrode 943 away from the third main electrode 9430 are arranged on horizontal planes having the same height.

In the embodiment shown in FIGS. 9A and 9B, the electro-optic modulator 900 further comprises a covering layer 950 that is formed on a side of the thin film layer 830 away from a substrate 910 and an isolation layer 920. The covering layer 950 comprises a first portion 950*a*, a second portion 950*b* and a third portion 950*c* that are sequentially arranged at intervals, where the first portion 950*a* covers a first optical waveguide 931, and the third portion 950*c* covers a second optical waveguide 932; the first main electrode 9410 is located on the thin film layer 930, the second main electrode 9420 is located on the thin film layer 930, and the third main electrode is located on the second portion 950*b*; and the terminal of the at least one electrode extension portion 9411 of the first ground electrode 941 close to the third main electrode 9430, the terminal of the at least one electrode extension portion 9421 of the second ground electrode 942 close to the third main electrode 9430, and the terminal of the at least one electrode extension portion 9431 of the signal electrode 943 away from the third main electrode 9430 are all located on the thin film layer 930. In some embodiments of the present disclosure, the covering layer 950 may also not comprise the first portion 950*a* and the third portion 950*c*.

Figure 10:
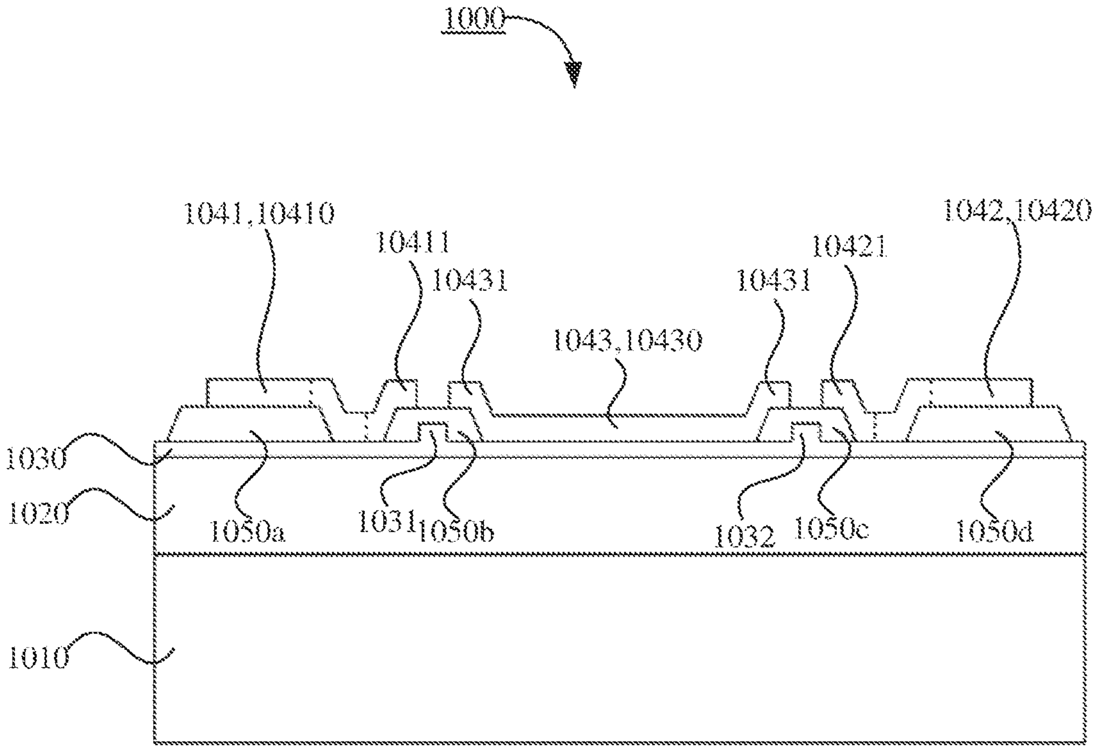
FIG. 10 is a schematic cross-sectional view of an electro-optic modulator according to an example embodiment.

As shown in FIG. 10, in some embodiments of the present disclosure, an electro-optic modulator 1000 further comprises a covering layer 1050 that is formed on a side of a thin film layer 1030 away from a substrate 1010 and an isolation layer 1020. The covering layer 1050 comprises a first portion 1050*a*, a second portion 1050*b*, a third portion 1050*c* and a fourth portion 1050*d* that are sequentially arranged at intervals, where the second portion 1050*b* covers a first optical waveguide 1031, and the third portion 1050*c* covers a second optical waveguide 1032; a first main electrode 10410 is located on the first portion 1050*a*, a second main electrode 10420 is located on the fourth portion 1050*d*, and a third main electrode 10430 is located on the thin film layer 1030; and a terminal of at least one electrode extension portion 10411 of a first ground electrode 1041 close to the third main electrode 10430 is located on the second portion 1050*b*, a terminal of at least one electrode extension portion 10421 of a second ground electrode 1042 close to the third main electrode 10430 is located on the third portion 1050*c*, a portion of a terminal of at least one electrode extension portion 10431 of a signal electrode 1043 away from the third main electrode 10430 is located on the second portion 1050*b*, and the other portion thereof is located on the third portion 1050*c*.

Figure 11:
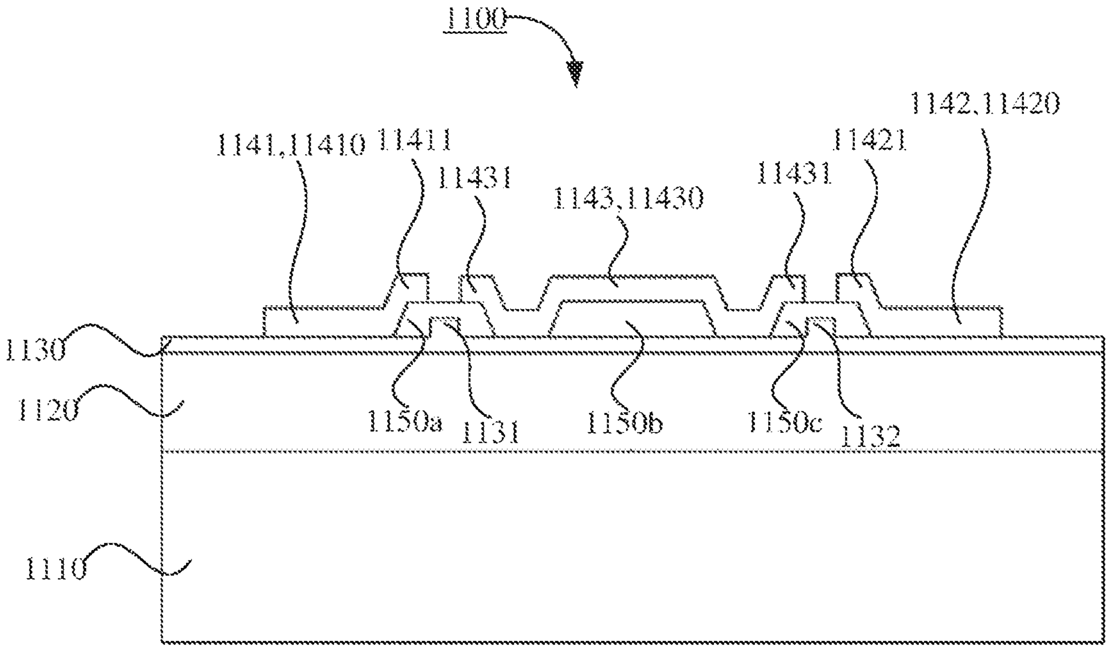
FIG. 11 is a schematic cross-sectional view of an electro-optic modulator according to an example embodiment.

As shown in FIG. 11, in some embodiments of the present disclosure, an electro-optic modulator 1100 further comprises a covering layer 1150 that is formed on a side of a thin film layer 1130 away from a substrate 1110 and an isolation layer 1120. The covering layer 1150 comprises a first portion 1150*a*, a second portion 1150*b* and a third portion 1150*c* that are sequentially arranged at intervals, where the first portion 1150*a* covers a first optical waveguide 1131, and the third portion 1150*c* covers a second optical waveguide 1132; a first main electrode 11410 is located on the thin film layer 1130, a second main electrode 11420 is located on the thin film layer 1130, and a third main electrode 11430 is located on the second portion 1150*b*; and a terminal of at least one electrode extension portion 11411 of a first ground electrode 1141 close to the third main electrode 11430 is located on the first portion 1150*a*, a terminal of at least one electrode extension portion 11421 of a second ground electrode 1142 close to the third main electrode 11430 is located on the third portion 1150*c*, a portion of a terminal of at least one electrode extension portion 11431 of a signal electrode 1143 away from the third main electrode 11430 is located on the first portion 1150*a*, and the other portion thereof is located on the third portion 1150*c*.

Figure 12:
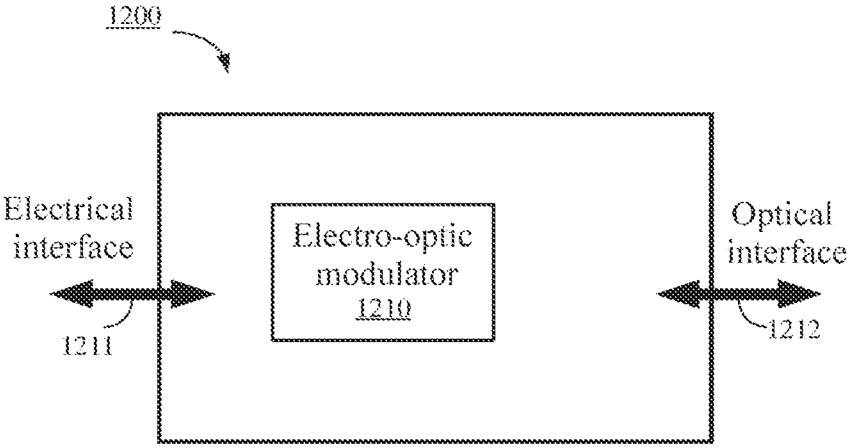
FIG. 12 is a schematic block diagram of an electro-optic device according to an example embodiment.

FIG. 12 is a simplified block diagram of an electro-optic device 1200 according to an example embodiment of the present disclosure. In an example, the electro-optic device 1200 may include an electro-optic modulator 1210, an electrical interface 1211 coupled to the electro-optic modulator 1210, and an optical interface 1212 coupled to the electro-optic modulator 1210. The electro-optic modulator 1210 may be constructed according to any one of the embodiments described above.

Although the embodiments or examples of the present disclosure have been described with reference to the drawings, it should be understood that the methods, systems and devices described above are merely example embodiments or examples, and the scope of the present disclosure is not limited by the embodiments or examples, and is only defined by the scope of the granted claims and the equivalents thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. An electro-optic modulator, comprising:

a substrate;

an isolation layer located on the substrate;

a thin film layer configured to form a first optical waveguide and a second optical waveguide, an arrangement of the first optical waveguide and the second optical waveguide causing the thin film layer to comprise a first edge region, the first optical waveguide, an intermediate region, the second optical waveguide and a second edge region;

an electrode, the electrode comprising a first ground electrode, a signal electrode and a second ground electrode, wherein the first ground electrode, the signal electrode, and the second ground electrode are sequentially arranged at intervals, the first ground electrode comprising at least a first main electrode, the second ground electrode comprising at least a second main electrode, the signal electrode comprising at least a third main electrode, the first optical waveguide being arranged in a first gap between the first main electrode and the third main electrode, the second optical waveguide being arranged in a second gap between the second main electrode and the third main electrode, the first main electrode and the second main electrode being arranged on a horizontal plane having a first height, the third main electrode being arranged on a horizontal plane having a second height, and the first height being different from the second height; and a covering layer, the covering layer at least partially covering an upper surface of the thin film layer, and a refractive index of the covering layer being lower than a refractive index of the thin film layer.

2. The electro-optic modulator according to claim 1, wherein the electrode is formed on a side of the thin film layer away from the substrate.

3. The electro-optic modulator according to claim 1, wherein the first main electrode and the second main electrode are embedded into the thin film layer, and penetrate through the thin film layer to be in direct contact with the isolation layer; or the first main electrode and the second main electrode are embedded into the thin film layer, and do not penetrate through the thin film layer.

4. The electro-optic modulator according to claim 1, wherein the third main electrode is embedded into the thin film layer, and penetrates through the thin film layer to be in direct contact with the isolation layer; or the third main electrode is embedded into the thin film layer, and does not penetrate through the thin film layer.

5. The electro-optic modulator according to claim 1, wherein the covering layer covers an upper surface of the intermediate region, wherein the first main electrode and the second main electrode are located on the thin film layer, and the third main electrode is located on the covering layer.

6. The electro-optic modulator according to claim 1, wherein the third main electrode is embedded into the covering layer, and penetrates through the covering layer to be in direct contact with the thin film layer; or the third main electrode is embedded into the covering layer, and does not penetrate through the covering layer.

7. The electro-optic modulator according to claim 1, wherein the covering layer covers upper surfaces of the first edge region and the second edge region, wherein the first main electrode and the second main electrode are located on the covering layer, and the third main electrode is located on the thin film layer.

8. The electro-optic modulator according to claim 1, wherein the first main electrode and the second main electrode are embedded into the covering layer, and penetrate through the covering layer to be in direct contact with the thin film layer; or the first main electrode and the second main electrode are embedded into the covering layer and do not penetrate through the covering layer.

9. The electro-optic modulator according to claim 1, wherein the covering layer covers the upper surface of the thin film layer, wherein the first main electrode, the second main electrode and the third main electrode are located on the covering layer, and a portion of the covering layer provided with the first main electrode and the second main electrode has a different thickness from a portion of the covering layer provided with the third main electrode.

10. The electro-optic modulator according to claim 1, wherein the covering layer has a dielectric constant less than dielectric constants of the first optical waveguide and the second optical waveguide.

11. The electro-optic modulator according to claim 1, wherein the covering layer is an insulation layer.

12. The electro-optic modulator according to claim 1, wherein each of the first ground electrode and the second ground electrode further comprises at least one electrode extension portion, the at least one electrode extension portion of the first ground electrode extends into the first gap from a side of the first main electrode facing the third main electrode, and the at least one electrode extension portion of the second ground electrode extends into the second gap from a side of the second main electrode facing the third main electrode.

13. The electro-optic modulator according to claim 12, wherein the electro-optic modulator further comprises a covering layer, the covering layer covering at least the first optical waveguide and the second optical waveguide, and a refractive index of the covering layer being lower than a refractive index of the thin film layer;

wherein the at least one electrode extension portion of the first ground electrode extends from a side of the first main electrode facing the third main electrode onto the covering layer on the first optical waveguide, and the at least one electrode extension portion of the second ground electrode extends from a side of the second main electrode facing the third main electrode onto the covering layer on the second optical waveguide.

14. The electro-optic modulator according to claim 1, wherein the signal electrode further comprises at least one electrode extension portion that extends into the first gap and the second gap respectively from a side of the third main electrode facing the first main electrode and a side of the third main electrode facing the second main electrode.

15. The electro-optic modulator according to claim 14, wherein the electro-optic modulator further comprises a covering layer, the covering layer covering at least the first optical waveguide and the second optical waveguide, and a refractive index of the covering layer being lower than a refractive index of the thin film layer; and the at least one electrode extension portion of the signal electrode extends respectively from a first side of the third main electrode facing the first main electrode and a second side of the third main electrode facing the second main electrode onto the covering layer on the first optical waveguide and the covering layer on the second optical waveguide.

16. The electro-optic modulator according to claim 1, wherein each of the first ground electrode and the second ground electrode further comprises at least one electrode extension portion, the at least one electrode extension portion of the first ground electrode extends into the first gap from a side of the first main electrode facing the third main electrode, and the at least one electrode extension portion of the second ground electrode extends into the second gap from a side of the second main electrode facing the third main electrode; and the signal electrode further comprises at least one electrode extension portion that extends into the first gap and the second gap respectively from a side of the third main electrode facing the first main electrode and a side of the third main electrode facing the second main electrode;

wherein a terminal of the at least one electrode extension portion of the first ground electrode close to the third main electrode, a terminal of the at least one electrode extension portion of the second ground electrode close to the third main electrode, and a terminal of the at least one electrode extension portion of the signal electrode away from the third main electrode are arranged on horizontal planes having the same height.

17. The electro-optic modulator according to claim 16, wherein the electro-optic modulator further comprises a covering layer formed on a side of the thin film layer away from the substrate, the covering layer comprising a first portion, a second portion, a third portion and a fourth portion, wherein the first portion, the second portion, the third portion, and the fourth portion are sequentially arranged at intervals, wherein the second portion covers the first optical waveguide, and the third portion covers the second optical waveguide;

the first main electrode is located on the first portion, the second main electrode is located on the fourth portion, and the third main electrode is located on the thin film layer; and the terminal of the at least one electrode extension portion of the first ground electrode close to the third main electrode is located on the second portion, the terminal of the at least one electrode extension portion of the second ground electrode close to the third main electrode is located on the third portion, a portion of the terminal of the at least one electrode extension portion of the signal electrode away from the third main electrode is located on the second portion, and the other portion thereof is located on the third portion.

18. The electro-optic modulator according to claim 16, wherein the electro-optic modulator further comprises a covering layer formed on a side of the thin film layer away from the substrate, the covering layer comprising a first portion, a second portion, and a third portion, wherein the first portion, the second portion, and the third portion are sequentially arranged at intervals, wherein the first portion covers the first optical waveguide, and the third portion covers the second optical waveguide;

the first main electrode is located on the thin film layer, the second main electrode is located on the thin film layer, and the third main electrode is located on the second portion; and the terminal of the at least one electrode extension portion of the first ground electrode close to the third main electrode is located on the first portion, the terminal of the at least one electrode extension portion of the second ground electrode close to the third main electrode is located on the third portion, a portion of the terminal of the at least one electrode extension portion of the signal electrode away from the third main electrode is located on the first portion, and the other portion thereof is located on the third portion.

19. The electro-optic modulator according to claim 16, wherein the electro-optic modulator further comprises a covering layer formed on a side of the thin film layer away from the substrate, the covering layer comprising a first portion, a second portion, and a third portion, wherein the first portion, the second portion, and the third portion are sequentially arranged at intervals, wherein the first portion covers the first optical waveguide, and the third portion covers the second optical waveguide;

the first main electrode is located on the thin film layer, the second main electrode is located on the thin film layer, and the third main electrode is located on the second portion; and the terminal of the at least one electrode extension portion of the first ground electrode close to the third main electrode, the terminal of the at least one electrode extension portion of the second ground electrode close to the third main electrode, and the terminal of the at least one electrode extension portion of the signal electrode away from the third main electrode are all located on the thin film layer.

* * * * *